United States Patent [19]

Dubin et al.

[11] Patent Number: 5,277,135
[45] Date of Patent: Jan. 11, 1994

[54] CONTROLLING CONCENTRATION OF CHEMICAL TREATMENT FOR FLUE GAS REDUCTION OF THE OXIDES OF NITROGEN

[75] Inventors: Leonard Dubin, Skokie; John E. Hoots, St. Charles, both of Ill.

[73] Assignees: Nalco Chemical Company; Nalco Fuel Tech, Naperville, Ill.

[21] Appl. No.: 980,600

[22] Filed: Nov. 23, 1992

[51] Int. Cl.$^5$ .............................................. F23J 15/00
[52] U.S. Cl. ..................... 110/345; 110/341; 431/2; 422/3; 422/168; 423/235
[58] Field of Search ....................... 110/344, 345, 341; 431/2, 5; 422/3, 119, 168; 423/352, 356, 235

[56] References Cited

U.S. PATENT DOCUMENTS

| | | | |
|---|---|---|---|
| 4,793,268 | 12/1988 | Kukin et al. | 110/345 X |
| 5,024,171 | 6/1991 | Krigmont et al. | 110/345 |
| 5,171,450 | 12/1992 | Hoots | 422/3 X |

*Primary Examiner*—Edward G. Favors
*Attorney, Agent, or Firm*—Kinzer, Plyer, Dorn, McEachran & Jambor

[57] ABSTRACT

In a furnace (boiler) installation where oxides of nitrogen are to be reduced to elemental nitrogen by treatment with a reactant such as a solution of urea, the desired amount of reactant (dependent on furnace specifics) is determined by comparing the fluorescent light intensity of a sample of the treating solution to the fluorescent light intensity of a calibration standard representing the desired amount of reactant concentration; in the case of non-comparison the concentration of reactant in the treating solution is altered until the intensities are substantially identical.

8 Claims, 2 Drawing Sheets

CONTROLLING CONCENTRATION OF CHEMICAL TREATMENT FOR FLUE GAS REDUCTION OF THE OXIDES OF NITROGEN

FIELD OF THE INVENTION

This invention relates to the treatment of flue gases in which noxious oxides of nitrogen are reduced to elemental nitrogen. The flue gas may be generated, for example, at a utility plant having a boiler burning fossil fuels, or it may be generated at a municipal solid waste combustion plant where solid waste itself is the furnace fuel. There are of course other examples of combustion processes where the invention may be practiced.

BACKGROUND OF THE INVENTION

It is known by U.S. Pat. Nos. 4,208,386 and 4,325,924 to treat flue gases with urea [$CO(NH_2)_2$] in the presence of oxygen to reduce noxious $NO_x$ ($x = 1$ or 2) to elemental $N_2$. The equations are elementary and need not be here discussed in detail other than to note that by-products of the treatment include water and carbon dioxide. Under ideal stoichiometric conditions one mole of urea reacts with two moles of $NO_x$, but the actual molar flow will vary for many reasons explained below. The variation may be as much as 0.5 to 2 moles of urea per mole of $NO_x$.

The treatment with urea helps to prevent so-called acid rain in that if $NO_2$ is released to the atmosphere it can combine with atmospheric moisture to form nitric acid, $HNO_3$. The treatment also helps avoid photochemical smog due to release of $NO_x$ to the atmosphere.

It is customary to dilute the urea with water, achieving a useful concentration in a solution which can be sprayed (atomized) into a furnace combustion column at a suitable point to reduce $NO_x$ to nitrogen. However, urea in solution imparts a high surface tension to the water. Consequently, in the preferred form of treatment, a surfactant is added to the urea solution. The surfactant reduces surface tension and therefore aids atomization (finer droplets) when the solution is sprayed into the stream of combustion gases before they attain the stack. The surfactant enlarges the spray pattern, promoting penetration and resulting in more effective contact with the combustion atmosphere.

Transportation of water is expensive and consequently the usual practice is for the manufacturer of the urea treating agent (solution) to ship a concentrated solution with a lower water content than actually required. The user, the operator of the combustion plant or facility, will therefore usually add dilution water. Dilution may also be done by a distributor. The amount of dilution will depend in part upon the estimate of the stoichiometric amount of urea needed for treatment of $NO_x$ in the flue gas. The stoichiometric amount of urea is the primary basis, but the amount of dilution will vary from plant to plant, and indeed can vary from day to day at any given plant. This is so because equilibrium of the chemical reactions involved is fuel dependent, temperature dependent and combustion rate dependent. The process is also dependent on oxygen concentration and the presence of reducing species such as carbon monoxide.

The necessary reaction to form $N_2$ normally occurs within a narrow temperature band. The band is about 1700°-2000° F. Certain additives may lower the range. The reactions are rapid and less residence time is required for high temperatures than for low temperatures. If the temperature is too low ammonia ($NH_3$) can result, known as "ammonia slip." Usually the best reaction takes place at about 1800° F. where ammonia slip is slight. If the temperature is too high, $NO_x$ can actually be regenerated. To reduce these counterproductive possibilities, to minimize formation of ammonia and carbon monoxide, and to achieve other advantages evident from the discussion above, various chemicals in small amounts may be added along with the surfactant, especially chemicals which serve as scale inhibitors, keeping the equipment clean and preventing blockage of the spray nozzles.

Indeed, as will be explained, the boiler or furnace may be monitored to determine the heat pattern or profile to be expected for the stream of combustion gas so that the point of urea injection (flue gas temperature point) and urea concentration can be selected to assure superior reduction of $NO_x$.

There are other chemical treatments besides urea for reducing $NO_x$ to $N_2$ and the present invention could be applied thereto as well. In other words, there are other reactants which will react with $NO_x$ in the essential reduction process resulting in innocuous $N_2$.

To use more reactant than needed can be wasteful if not counterproductive. On the other hand, when there is a drastic or sudden change in combustion parameters, the dilution may be too great, requiring a large dosage (increased concentration) of the treatment chemical used for reduction. The primary object of the present invention is, therefore, to enable a specified or needed concentration of a reactant in a water solution, for reducing $NO_x$ to an acceptable level, to be achieved at a plant where fuel when burned will release $NO_x$ to the stack. A related object of the invention is to enable the concentration of the needed reactant in the treating solution to be readily monitored and controlled to meet the required $NO_x$ reduction for specific performance of the furnace.

The supplier of a urea treating agent that will contain specialized additives will produce a concentrated solution for economy reasons mentioned. This concentrated solution will typically be concentrated far beyond the needs of the furnace operator and therefore will be diluted by the end user either prior to filling a holding tank or by direct in-line mixing as will be described below. The supplier or distributor or ultimate user can add a known amount of the tracer to the concentrated solution and then undertake a needed dilution, using a calibration standard under and in accordance with the present invention.

SUMMARY OF THE INVENTION

Under and in accordance with the present invention we propose to monitor and control the chemical treatment for a flue gas to comply with a calibration standard determined as the appropriate concentration of $NO_x$ reactant for the prevailing combustion conditions or parameters discussed above. We do this by measuring the fluorescent light intensity of an energized ("excited") sample of the treatment to be sprayed into the combustion gas, the treatment (of which urea dissolved in water is a good example) containing a known amount of an inert fluorescent tracer. By the term "inert" we mean the tracer is not chemically reactive in, or with any part of, the treatment solution nor are its physical properties (including fluorescent intensity when excited) altered within or by the treatment solution; see U.S. Pat. No. 4,783,314. The tracer eventually may be altered or even destroyed in the flue gas, but this occurs after the utility of the tracer has been exploited. Thus, if the tracer in a known amount (ppm, or weight percent) is combined with the treating agent in a known amount, the intensity of the sample when excited will be a measure of the treating agent concentration.

A wide variety of fluorescent tracers may be added in a known amount to the treating solution as will be explained below. The concentration of the urea (or substitute reactant) is also known for the sample, of course. A fluorescence measurement of the sample can be taken and compared to the light intensity provided by a reference (calibration standard) solution of the tracer. If the fluorescence of the sample evidences a concentration of chemical treatment which is too high, further dilution of the reactant is undertaken to provide the desired or specified concentration. If the fluorescence of the sample is too low, the amount of dilution is reduced either by reducing the flow of diluent or increasing the feed rate of the concentrated treating solution needed for $NO_x$ reduction.

The invention is also an aid to verifying by fluorescent comparisons the concentration of urea in an initial dilution of the concentrated solution which may be needed for practical purposes.

The presence of a fluorescent compound in a treatment program allows concentrations to be monitored, evidenced for example by Hoots U.S. Pat. No. 4,783,314.

THE COMBUSTION PROCESS AND UREA TREATMENT—GENERALLY

Figure 1:
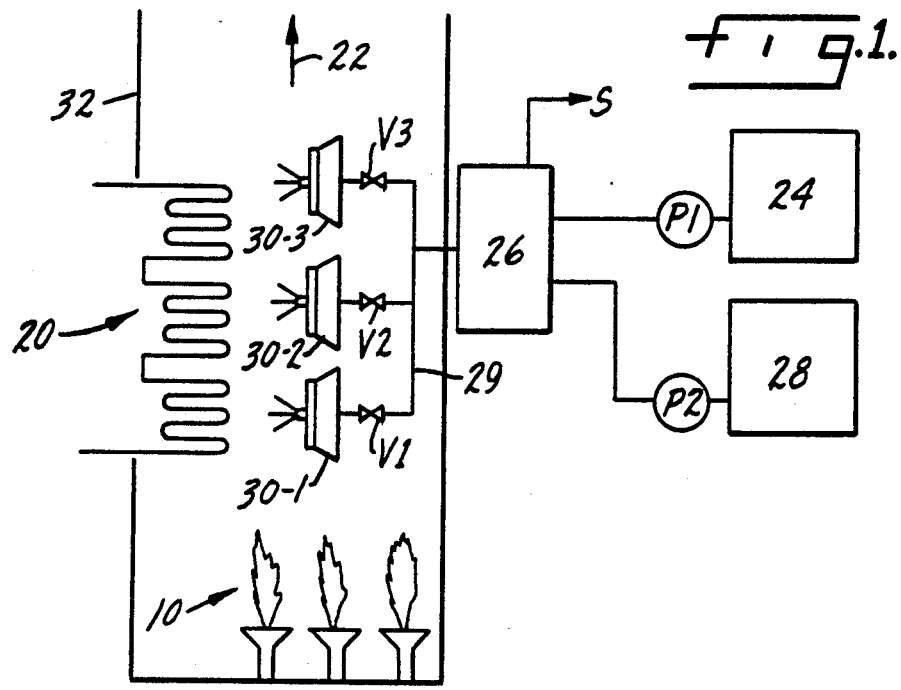
FIG. 1 is a schematic view of a furnace showing how the present invention may be practiced.

FIG. 1 is a schematic view illustrating a typical furnace arrangement, such as a utility plant boiler, in which the present invention may be used. The furnace flame 10 generates hot gases which heat the boiler tubes 20 inside the combustion chamber or so-called firebox and then the gases follow path 22 toward the stack or flue. The transit to the stack may involve a considerably more complex path than suggested by FIG. 1, but an exact path and list of attendant equipment are not necessary to an understanding of this invention, that is, equipment such as economizers, superheaters, electrostatic precipitators and so on.

Instead of a boiler furnace burning fossil fuel at a utility plant, the furnace may be that of a municipality burning solid waste for generating power, for heating water or merely to incinerate.

An aqueous solution of urea (relatively concentrated with urea) is stored in a holding tank or chamber 24 and pumped (pump P1) to a mixer 26. The solution may contain a surfactant and special enhancers (e.g. chemicals to combat scale). Water for dilution is also pumped (pump P2) from a holding tank 28 to the mixer 26. The pumps are preferably variable rate (metering) pumps.

The mixer includes a pump such as a rotary positive displacement pump (not shown) which mixes the contents and forces the mixed contents under pressure to a manifold 29 which services a plurality of injectors (nozzles) 30-1, 30-2 and 30-3 positioned at different levels (different temperature points) in the walls of the combustion column or chamber 32 as shown in FIG. 1. There may be as few as two nozzles at each level or as many as six or seven, depending mostly on furnace size. This is a selective injection achieved by computer controlled valves V1, V2 and V3, respectively assigned to a related injector, which is to say that any one or any selected combination of injectors will be employed to enable the gases of combustion to be treated with the sprayed solution since, as mentioned above, the reaction (reduction to $N_2$) is temperature dependent. The area of contact between the atomized treatment solution and gases in the combustion column 32 is where reduction to $N_2$ takes place. All three levels of injectors 30 for example may be active at positions (reading upwards, FIG. 1) corresponding to 2000° F., 1800° F. and 1600° F. for a typical day; or only one, or a combination of any two. This selective valve actuation is computer controlled, depending upon the furnace load as will be discussed in more detail below. As noted above, this range (1600°-2000° F.) may be lowered.

Because of the various factors which effect the reduction of $NO_x$, it is advantageous from both an economy and efficiency standpoint to optimize the effective amount of urea emitted by the spray nozzles, herein 30 collectively. More specifically, as related to the present invention, the concentration of the active agent (e.g. urea) in the treatment solution may be altered by adjusting the pumping rates of pumps P1 and P2 concurrently with control over the valves used for controlling spraying. The computer calculation based on a flue gas analysis for $NO_x$ may not only require a valve change, but also a change in urea concentration.

Under the present invention concentration changes are accomplished by sampling the mixed (diluted) treatment solution and comparing its light intensity (fluorescent intensity) when excited to a fluorescent intensity value deemed a standard for the prevailing $NO_x$ conditions according to a determination of what level of $NO_x$ emission reduction is allowed or is to be achieved. If the concentration of the treating agent is too high, the rate of feeding dilution water will be increased; if too low, water dilution may be stopped or the rate of feeding the concentrated (urea) solution (tank 24) will be increased, or both. The measurement and concentration control can be either intermittent or continuous.

We know of no reactant for $NO_x$ reduction which is fluorescent. However, it is best to use local water, and to include the treating agent, when undertaking the calibration for the standard as this will take into account any background or unknown fluorescence. Also, the amount of tracer should always be in excess of that which reduces any background fluorescence to a non-interfacing level.

DETAILED DISCLOSURE

Urea will be the example. The urea solution normally stored in tank 24 is referred to herein as the concentrated urea solution, that is, the amount or concentration of urea on a weight percent basis is usually higher than necessary, which economizes shipment, as explained above. It is for this reason that dilution water, FIG. 1, is usually pumped to the mixer. The exact value (weight amount) of the urea content of the solution in tank 24 is not necessary to an understanding of the present disclosure. The solution also contains a predetermined amount (weight basis) of a surfactant which may be and preferably is alkylphenol ethoxylate. To the best of our knowledge the fact that these classes of surfactants are naturally fluorescent (emissivity of about 305 nm at an excitation of about 275 nm) has never been exploited as a control (tracer) in an $NO_x$ flue gas reduction process.

Regardless, by incorporating a tracer in the treatment solution which may or may not be a surfactant, it becomes possible to calibrate various water dilutions of the treating solution for fluorescence readings (light intensity values) corresponding to proportional urea concentrations. As noted above, diluting the treating solution itself will be self correcting for any background fluorescence. In theory, however, where it is known there is in fact no background fluorescence, the tracer itself, alone, can be diluted for calibrations, e.g. FIG. 2.

A sample of the treatment solution (in mixer 26) being pumped to the spray nozzles can be excited at the wavelength required to produce fluorescent intensity. The intensity of fluorescence thus produced for the sample can be compared (percentage-wise for example) to the known intensity of the calibration standard. By comparison, then, it can be determined how the treatment solution compares with the standard in terms of concentration of the treating agent. By such comparison, it can be determined whether it should be altered from the standpoint of active reactant (product) concentration, either more or less, or allowed to stand as it is. The comparison may be an intermittent one, or continuous.

The calibration standard, as noted above, is or will correspond to a selected treating agent concentration, preferably chosen for the specific furnace load, knowing the needed $NO_x$ reduction. It becomes the calibration standard for the analyzer, and the needed, operating concentration will be a percentage of the standard, depending on operating circumstances, say 80% or even 110%. For convenience herein, the corresponding calibration standard solution concentration is termed the "100%" actual concentration in the tabulation which follows, based on actual readings in which the surfactant (tracer) was nonylphenol ethoxylate, excitation at 275 nm with a 305 nm reading as the intensity of fluorescence:

TABLE 1

| Sample | 1 | 2 | 3 | 4 |
| --- | --- | --- | --- | --- |
| A | 100% | 50 | 100 | 50 |
| B | 60% | 30 | 58.2 | 30 |
| C | 40% | 20 | 38.9 | 20 |
| D | 20% | 10 | 18.2 | 10 |
| E | 0% | 0 | 0 | 0 |

Column Description - (Table 1)
1: Concentration (actual) of base product after dilution - Sample A had no dilution
2: Theoretical % urea
3: % Concentration base product as measured by percent relative fluorescence - Undiluted Sample A is 100%
4: ppm (theoretical) tracer (nonylphenol ethoxylate)

The starting solution for the samples in Table 1 was 99.5 weight percent of a 50% urea-in-water solution of which the remaining 0.5% for the starting solution was represented by nonylphenol ethoxylate (fluorescent) tracer. The relative weight ratio urea:tracer was 10,000:1. The undiluted Sample A contained 50 ppm tracer (column 4), and while the urea content was 49.75 ($99.5 \times 0.5 = 49.75$) this value is rounded off in column 2 to a value of 50 without any significant error. In like manner, the urea content at 60% dilution (Sample B) would have been 29.85 ($49.75 \times 0.6 = 29.85$) rounded off to 30 and the ppm tracer would be $50 \times 0.6 = 30$. As a result of rounding off, it is a coincidence that columns 2 and 4 present identical numbers.

With further regard to Table 1, it will be recognized that insofar as the actual (active) amount as % urea is concerned, column 4 gives the values of the correlated tracer in ppm. This is mentioned because it is sometimes customary to refer to a 100% treatment product (Sample A) which is the one marketed and which will be diluted to various percentages by the user. As already mentioned, if a 100% treatment contains 50 weight percent reactant (urea) and 50 ppm tracer (Table 1), then a solution diluted to 60% of the original will contain 30 weight percent urea reactant and 30 ppm tracer, Sample C. These concentration relationships of diluted treatment are consistent with and can be predicted by the fluorescence readings. This will become evident in the discussion of FIG. 4.

Figure 2:
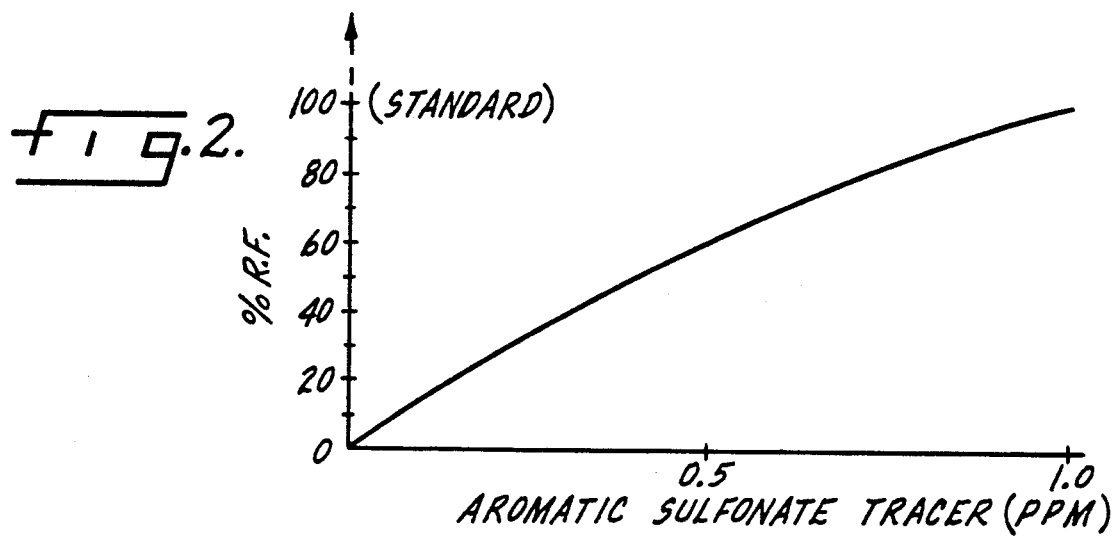
FIG. 2 is a graph showing how percent relative fluorescence varies directly with the concentration of a fluorescent species.
Figure 2A:
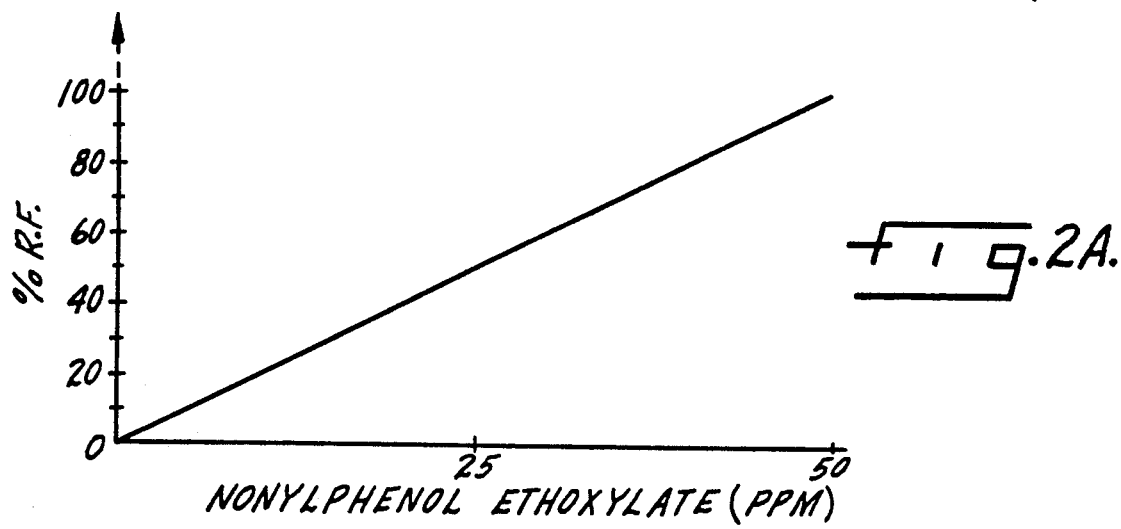
FIG. 2A is a graph showing percent relative fluorescence (percent RF, vertical axis) versus tracer as a calibration standard.

Thus, as the treatment solution (concentrated base solution, tank 24, FIG. 1) is diluted progressively to zero, the fluorescent intensity of the excited sample, proportionally decreases. Statistically there is a linear relationship (FIG. 2) between relative fluorescence intensity (% RF) and ppm tracer or, correspondingly, % product. The coefficient of correlation is 0.997. In other words, as shown by FIG. 2, as the parts per million of fluorescent tracer decreases due to dilution water added to the concentrated chemical treatment solution containing the tracer, the fluorescent intensity of the sample decreases proportionally when considering (taking) the standard (e.g. 1.0 ppm tracer) as 100% RF. The chemical treatment (effective reagent) concentration varies the same way.

Using the data in Table I, column 2 or 3 vs. column 4, % relative fluorescence (FIG. 4) therefore becomes a measure of chemical treatment concentration. Indeed, by this means the distributor or the ultimate user of the urea solution can undertake an initial dilution to a known concentration for tank 24 or by in-line dilution via pump P2, FIG. 1. This will be done by preparing a calibration standard in which a known amount of tracer represents the desired urea concentration. A sample of the concentrated solution will then be progressively diluted and concurrently compared to the standard until the fluorescent intensities match (are substantially equal). The concentrated solution will then be likewise diluted.

Figure 3:
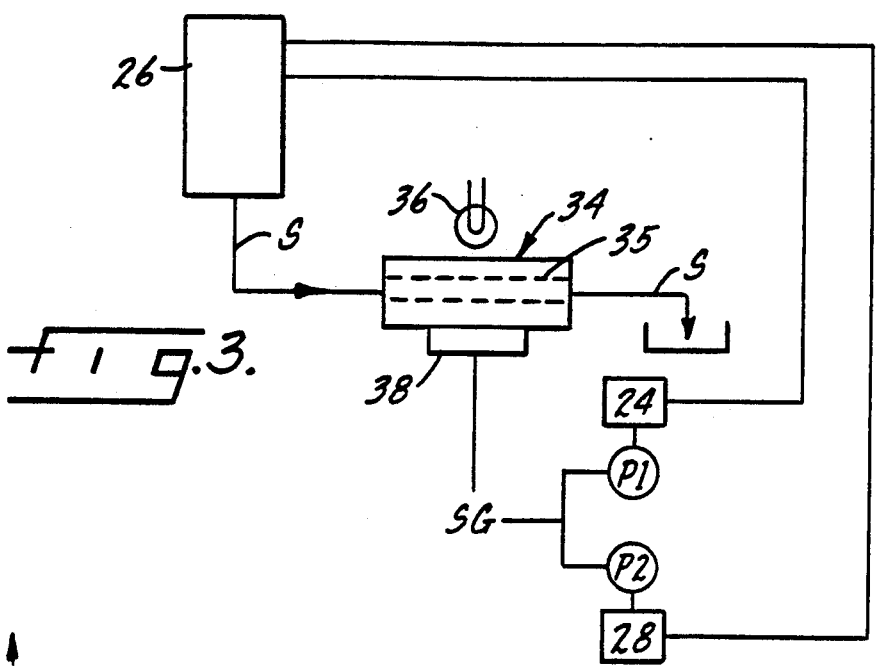
FIG. 3 is a schematic view showing further features of the present invention in practice.

A procedure is shown in FIG. 3. A sample S is taken from the mixer 26 (also cf. FIG. 1) and delivered to an analyzer 34. In the instance of analyzing fluorescent tracer, the analyzer may be characterized by a quartz cylinder or tube which is transparent to ultraviolet light generated by a light source 36. The light source will operate at the wavelength necessary to excite the fluorescent surfactant or other fluorescent tracer compound as disclosed hereinafter. Other forms of energy could be used to excite (energize) the fluorescent compound.

At a 90° angle from the light source is a transducer 38 which transforms the fluorescent light emitted by or from the activated sample into a signal SG which may be DC voltage, DC amperage, pulse frequency and the like as an analog of the tracer concentration and therefore an analog of the chemical treatment concentration of which urea concentration is an example. This mode of transformation and analog signal generation is disclosed for example in U.S. Pat. Nos. 4,992,380 and 5,041,386.

The analog signal will be used to control equipment which feeds the chemical treatment and/or diluent most likely water. The analog signal can also be used in several ways to produce an intelligible record of the chemical treatment concentration thus analyzed. As an example, the signal can be recorded (e.g. dial indicator) as a direct reading correlated to percent chemical treatment.

Figure 4:
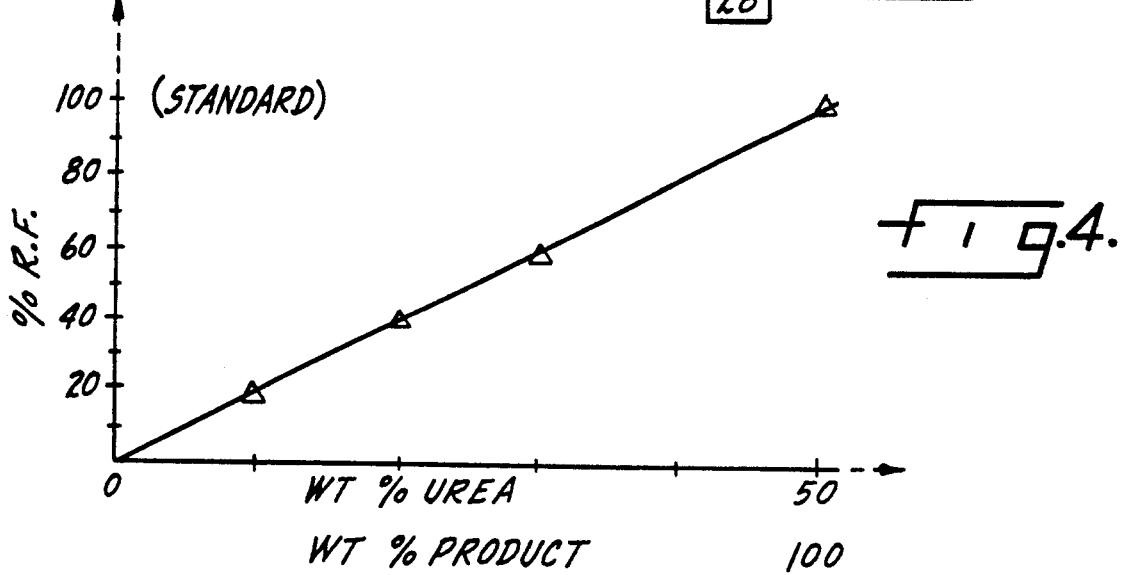
FIG. 4 is a graph showing how the treating agent or product concentration in a sample containing a known amount of a tracer may be compared to a standard.

In any event, the fluorescent intensity of the (excited) sample is compared at the analyzer, FIG. 3, to the fluorescent intensity of a standard, FIG. 4, representing the desired or needed chemical treatment concentration and one or the other or both of pumps P1,P2 (FIG. 3) will be controlled to achieve the desired concentration of $NO_x$ reduction chemical indicated, of course, when the fluorescent intensity of the sample reaches the required % RF level. This level will vary depending not only upon the boiler specifics but the fuel quality, time of day (peak hours) boiler load and so on.

As an example, and referring to FIG. 4, if the required application is 30% product (treatment from tank 24), then the 100% product (Sample A) must be diluted with water until the product to be fed to the sprayers exhibits a fluorescence measurement indicating a 30% product has been obtained, whether achieved by dilution from a bulk storage tank or continuous in-line mixing via pump P2. If it is subsequently desired to change the use concentration either greater or less than 30%, then either pump P1 and/or P2 would be opened or closed to create the desired product percentage as indicated by the fluorescence measurement.

Figure 5:
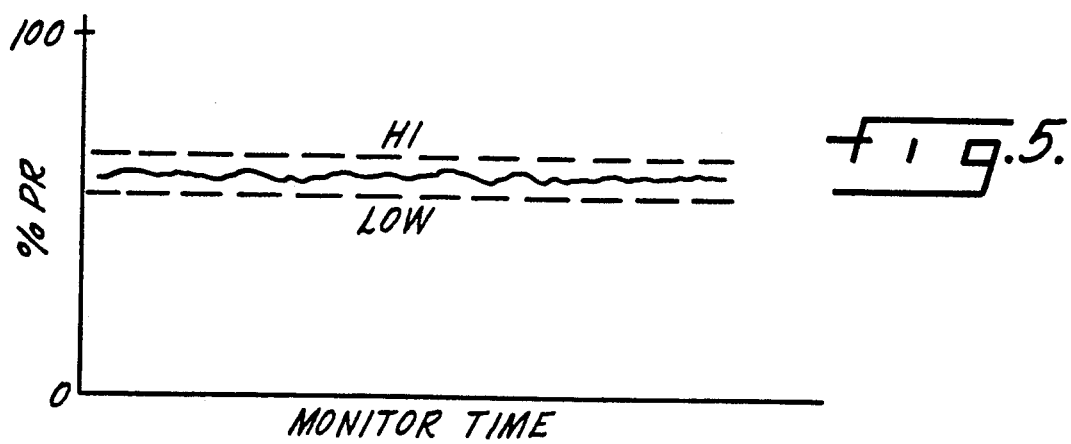
FIG. 5 is a graph showing continuous monitoring of a treating solution between allowable high and low concentration limits.

It is not generally practical or necessary to control the treatment concentration to an exact value. A range is acceptable. The analyzer or transducer 38 may in effect be constructed with limit set points (see U.S. Pat. No. 5,041,386) so that as long as the analyzed concentration lies within the range the pump controls will be unaffected. This is shown in FIG. 5 where the vertical axis is % product, % PR, and the horizontal axis is time, continuous display or print-out.

The tracer need not be limited to nonylphenol ethoxylate surfactant. Other fluorescing surfactants may be used such as octyl phenol ethoxylate, dialkylphenol ethoxylates and alkylnaphthylene ethoxylates. If the temperature of the treatment solution transmitted to the nozzles is exceptionally high, then highly heat resistant fluorescent surfactants would be employed such as 1,5 naphthalene disulfonic acid (excitation 290 nm, emission 330 nm) or pyrene tetrasulfonic acid which emits at 400 nm when excited at 365 nm. An independent fluorescent tracer could of course be used instead of one that is also a surfactant, but if a surfactant is present, care must then be exercised to be sure there is no interference and that fluorescence is sufficiently diverse to be distinguished.

It is preferred that the tracer, when fluorescent, be characterized by an excitation wavelength range of about 200-850 nanometers and a fluorescent "output" range of about 205 to 855 nanometers. Non-interfering functional group may be present in the fluorescent compound (sulfonate, hydroxyl, carboxylate, amino, amide, etc.). Aromatic rings may be present.

The independent tracer may also be chosen from a wide variety of chemicals including dyes and transition metal-containing ions (colorimetry); also metal cations and anions (with ion selective electrodes as the instrument) which are inert in the $NO_x$ treatment solution. Some of such other chemicals are disclosed in U.S. Pat. No. 5,132,096 for example. Two or more distinctive tracers (distinguishable on analysis) may be used.

There is reference above to selection of a fluorescent tracer in terms of possible high temperature of the treatment solution. High temperatures can cause a breakdown of tracers such as the ethoxylates listed above. In the instance of urea, high temperatures can indeed occur because it sometimes becomes advantageous to heat the urea solution above the boiling point in the mixer or at some other point prior to transmittal to the spray nozzles. This helps to enhance hydrolysis of urea, resulting in desirable reaction products. The temperature may be as high as 250°-500° F. Pressures in the mixer 26 may be as high as 1,800 psi, further contributing to breakdown of a treatment component such as alkylphenol ethoxylate which is thoroughly stable and reliable at or near ambient conditions. Therefore, in those instances where the treating solution can be expected to encounter high temperatures or intense shearing forces prior to reaching the spray nozzles, highly heat and shear resistant tracers should be used such as 1,5 naphthalene disulfonic acid or pyrene tetrasulfonic acid. At lower temperatures where the alkylphenol exthoxylates are thermally stable and fulfill the requirements of an inert tracer, then those compounds could be suitable for monitoring and/or controlling dilution in the manner explained above.

Parameters Aspects

The selection of the operating nozzles and concentration of the active treating agent are based on two major factors or parameters. The selection of the nozzle height or level is a function of temperature and is therefore a matter of combustion engineering, dependent upon the current furnace load or its equivalent, that is, whether the furnace is operating at its rated high load (100%) or some percentage above or below. The higher the furnace load, the higher the combustion chamber temperature, and vice versa.

Bearing in mind that the temperature will always be cooler at a higher location in the combustion chamber (at valve level 30-3), this means that under a high furnace load the optimum reaction temperature (say 1800° F.) will be upwards at level 30-3 for example, but for a lower furnace load the value of 1800° F. will be at a lower level, say 30-1.

The furnace load percentage can be determined in different ways; by megawatt rating, or by steam generation rate (#/hr) or by other ways. In any event, the nozzle level selection to inject the treatment solution at the optimum temperature level (valve activation) is based primarily on furnace load and, if a great deal of treatment solution is required quickly, the flue gas analysis will also feature in nozzle activation by calling for more nozzles to be activated. It can therefore be visualized that different levels of active nozzles may be used, and combinations thereof, covering a range or limited to one level.

The second factor is $NO_x$ load, which is a matter of analyzing the flue gas and determining from the $NO_x$ output how much (volume) and at what concentration the treating solution should be fed. The analysis will be stoichiometric, but the feed may not necessarily be stoichiometric for reasons explained above.

When discussing or mentioning nozzle selection, it is of course the valve (V1, V2, V3) which is selected, either valve-off or valve-on whereby the treating solution is not or is emitted by the related nozzle. Throughout the specification it is to be understood that excitation or energization of the tracer is preferably accomplished by irradiation and that light or fluorescent intensity means the same as emission.

Hence, while we have illustrated and described preferred embodiments of the present invention, it is to be understood that these are capable of variation and modification.

We claim:

1. In a fuel burning process conducted in a furnace where the gases produced by combustion in a combustion chamber are released to the air through a stack, in which oxides of nitrogen ($NO_x$) resulting from combustion are to be reduced to a specified level of $NO_x$ by a reactant reactive with $NO_x$ and contained in a solution fed into the combustion gases prior to those gases reaching the stack, in which said solution contains both a known amount of reactant for reduction of $NO_x$ to $N_2$ and a known amount of an inert fluorescent tracer representing the reactant concentration, the improvement characterized by the steps of:
    (a) withdrawing and exciting a sample of the solution to cause the tracer to fluoresce, and measuring the intensity of the resultant fluorescence;
    (b) comparing the measured fluorescence of the sample to the fluorescence of said tracer taken as a standard representing the concentration of the reactant for achieving said level of reduction;
    (c) and altering the concentration of the reactant in the treating solution until the intensity of the standard is achieved.

2. Method according to claim 1 in which the reduction process is temperature dependent, in which valve-controlled nozzles are arranged in the combustion chamber at progressive levels corresponding to different combustion temperature values, and in which the valves are selectively actuated concurrently with alteration of the reactant concentration to conduct the reduction process under both a specified reactant concentration and temperature range.

3. A method according to claim 1 in which the reactant is urea dissolved in water, and in which the tracer is an alkylphenol ethoxylate.

4. A method according to claim 2 in which the reactant is urea dissolved in water, and in which the tracer is an alkylphenol ethoxylate.

5. A method according to claim 1 in which the reactant is urea dissolved in water, and in which the tracer is a heat-resistant surfactant selected from the group consisting of 1,5 naphthalene disulfonic acid and pyrene tetrasulfonic acid.

6. A method according to claim 2 in which the reactant is urea dissolved in water, and in which the tracer is a heat-resisting surfactant selected from the group consisting of 1,5 naphthalene disulfonic acid and pyrene tetrasulfonic acid.

7. A method according to claim 1 in which the reactant is urea dissolved in water, in which there is a source of dilution water to be combined with the urea solution for diluting the urea solution, in which the tracer is a surfactant dissolved in the urea solution and in which step (c) is achieved by altering the rate at which the urea solution is fed and by altering the rate at which the dilution water is combined with the urea solution.

8. A method according to claim 1 in which steps (a), (b) and (c) are preceded by preparing said solution in the form of a starting solution by the following steps:
    (1) preparing a highly concentrated solution of the reactant and adding the tracer thereto in a known amount;
    (2) exciting a sample of the highly concentrated solution to produce fluorescence and adding a diluent thereto until fluorescence of said sample matches the fluorescence of a starting solution standard of like dilution; and
    (3) undertaking a like dilution of the concentrated solution to match the standard.

* * * * *